E. TYDEN.
SEAL LOCKED LIQUID HOLDING VESSEL.
APPLICATION FILED APR. 1, 1915.
1,146,463. Patented July 13, 1915.
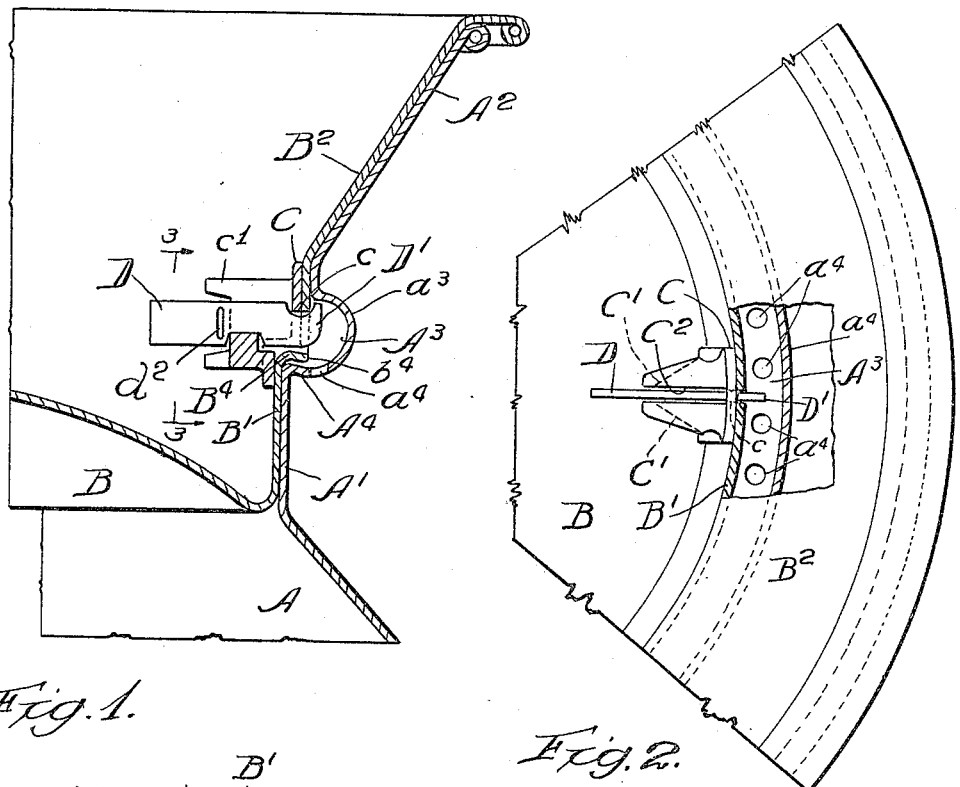
Fig. 1.
Fig. 2.
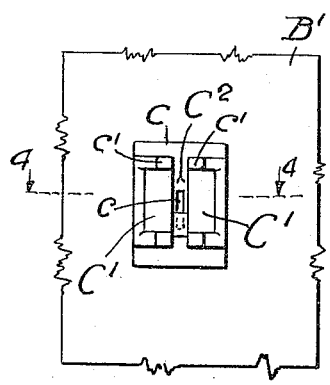
Fig. 3.
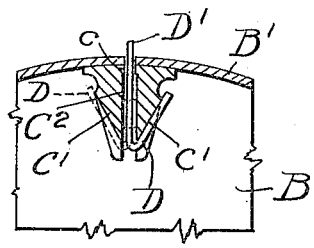
Fig. 4.
Witnesses:
Inventor
Emil Tyden.
by Burton & Burton
his Attys:

UNITED STATES PATENT OFFICE.

EMIL TYDEN, OF EVANSTON, ILLINOIS.

SEAL-LOCKED LIQUID-HOLDING VESSEL.

1,146,463. Specification of Letters Patent. Patented July 13, 1915.

Application filed April 1, 1915. Serial No. 18,462.

*To all whom it may concern:*

Be it known that I, EMIL TYDEN, a citizen of the United States, and resident of Evanston, in the county of Cook and State of Illinois, have invented new and useful Improvements in Seal-Locked Liquid-Holding Vessels, of which the following is a specification, reference being had to the accompanying drawings, forming a part thereof.

The purpose of this invention is to provide an improved form of liquid-holding vessel, such as a milk can provided with means for seal-locking it.

It consists in the elements and features of construction shown and described, as indicated in the claims.

In the drawings:—Figure 1 is a vertical axial section of a milk can equipped with this invention. Fig. 2 is a detail top plan view showing a segment of the vessel. Fig. 3 is an interior side elevation of a sufficient portion of the can cover to comprise a seal locking device shown in elevation. Fig. 4 is a section at the line, 4—4, on Fig. 3.

This invention may be regarded as an improvement upon the invention shown in my Patent No. 1,080,183, dated December 2, 1913, comprising and pertaining to the structure of a vessel for holding liquid, such as a milk can, in which the body and cover are connected together by telescoping one within the other for closing the can, and in which the exposed one of the two telescoping members has mounted upon it a housing or mount for a locking bolt which is thrust through the member on which the housing is mounted, engaging a groove in the other member of the can, the mount or housing being necessarily mounted on an exposed surface of the member which carries it and the groove being necessarily in the surface which is lapped by the other of the telescoping members at their telescoped parts, and which therefore is not exposed. When this sort of a device is applied to a can of the structure of the common milk can in which the cover is itself an upwardly-open bottomed or cup-shaped member and telescopes within the can body, both the members which are thus telescoped with each other have an outer side,—that is an exposed side,—and the locking device may be mounted on either member indifferently so far as the operation of the elements for locking and sealing is concerned. In my said patent the lock is shown mounted on the outer side of the body which is the exteriorly-telescoped one of the two telescoped members. When thus mounted the lock protruding somewhat and the seal bolt usually farther protruding, are more or less exposed to collision in the handling of a quantity of these cans together; and the seal bolts being of the character designed to be broken for unsealing are somewhat exposed to liability of accidental breakage. For this reason I have devised the structure of this application in which the locking and sealing device is mounted within the cavity of the cup-shaped upwardly-open cover, being the interiorly-telescoped of the two members of the can.

In the drawings, A is the can body having the customary cylindrical neck, $A^1$, and flared upper end portion or mouth, $A^2$.

B is the interiorly-telescoped upwardly-open bottomed, and therefore cup-shaped, cover member having also the neck portion, $B^1$, and the flaring mouth portion, $B^2$, corresponding to the similarly shaped portions of the can body and seating upon them respectively in telescoping. Upon the exposed wall of the cavity of the cup-shaped cover there is secured the mount, C, which has an aperture, $c$, coinciding with an aperture made in said wall of the cover, through which the seal bolt, D, hereinafter more particularly described, is thrust for engaging the body by entering a groove, $A^3$, of said body, said groove opening at the inner surface of the neck, $A^1$,—that is, at the telescoped portion. The groove is most conveniently formed by rolling it into the substance of the sheet metal body, producing an exterior bead, $a^3$. It is most convenient to extend this bead and groove all around the neck; but the extent is not material, though preferably it should extend for a considerable segment in order to avoid the necessity for accurate relative positioning of the two members when closing the can for locking and sealing. The mount, C, has a V-shaped projection, $C^1$, extending off inwardly from its base substantially radially with respect to the can, in which cutting the apex of said projection there is an upwardly-open slot or channel, $C^2$, which is alined with the aperture, $c$, for the purpose of admitting the seal bolt, D, which is inserted vertically edgewise downward with an inward thrust for engaging its inner hooked end, $D^1$, through the aperture, $c$, and in the groove, $A^3$. The outer end of the abutment, $C^1$, has a projection, $c^1$, positioned so that the seal bolt, D, after being entered into locking position as described, being bent to the right or left over the more or less acute end of the abutment passes into the recess, $c^2$, under said projection, $c^1$, preventing the seal from being lifted edgewise in the manner and direction necessary for disengaging its hooked end from the groove, $A^3$. The seal is weakened at the line of folding over the acute edge of the abutment, as for example by being apertured as shown at $d^2$, nearly across its entire width, so that having been folded as described to engage under the projection, $c^1$, it cannot be straightened back into position to permit it to be given the necessary edgewise movement for disengaging it without being broken and thus disclosing the fact that it has been tampered with.

For some purposes there is a slight objection to mounting the seal lock in the cavity of the cover as described, as compared with mounting it on the exposed surface of the exterior telescoped member which is the body of the can. This objection is that in the case of milk cans, for example, the cup-shaped cavity of the cover is liable to become filled with rain water while the cans are standing out-doors in the course of transportation, and said cup-shaped cavity becoming filled up to the height of the bolt aperture, the water may pass through said aperture and down between the two telescoped surfaces of the body and cover and so enter the can and impair the contents. To defeat the possibility of this undesirable happening when the seal lock is mounted on the exposed surface of the cover, that is, within its cup-shaped cavity, I prefer to construct the can body as shown in the drawings, slightly reduced in diameter at the neck at the horizontal plane of the lower margin of the groove, $A^3$, forming an upwardly-facing shoulder, $A^4$, the cover being correspondingly constructed reduced in diameter at the lower part of the cup-shaped portion for telescoping within the reduced portion of the neck of the body; which results in a downwardly-facing shoulder, $B^4$, on the outer side of said cup-shaped cover member overhanging the shoulder, $A^4$, of the body.

Preferably the shoulders, $A^4$ and $B^4$, are positioned on the body and cover respectively at such distances from the flared portions of the cover and body which seat upon each other, stopping the insertion of the cover, that the shoulder, $B^4$, will not quite reach the shoulder, $A^4$, when the cover is fully inserted seating said flared portions one upon the other, but will only overhang the shoulder, $A^4$, as above stated. Preferably also both of the shoulders, $A^4$ and $B^4$, are pitched at a slightly acute angle to the cylindrical portions of the body and cover respectively immediately below them,—that is, so that they slope a little outward and downward. This tends to make a slight pocket of the groove, $A^3$, and a lip, $b^4$, at the outer circumference of the shoulder, $B^4$, dipping into said pocket. At one or more points, preferably at several points, in the circumference of the groove and shoulder, $A^3$ and $A^4$, the can body is apertured as seen at $a^4$, $a^4$, the apertures being at the deepest or lowest point of the slight pocket formed as described. The result of this construction is that any water or other fluid entering through the bolt aperture of the locking device comes into the groove, $A^3$, and escapes through the apertures, $a^4$, before the accumulation is sufficient to permit it to flow out of the apertures down between the telescoped members of the can and body into the cavity of the can. The reason for preferring to position the lip, $b^4$, a little above the shoulder, $A^4$, is to prevent the moisture being carried by capillary attraction, as it would be between two surfaces in contact, inward, and thus possibly downward, between the contacting surfaces of the telescoped can body and cover.

I claim:—

1. In a can comprising a body and cover telescoped with each other for closing, the cover being upwardly-opened-cup-shaped and telescoped within the body, in combination with such body and cover a locking device comprising a mount or bolt-housing mounted on the exposed wall of the cup-shaped cover within the cup cavity thereof; the body having a groove at its telescoped part opening toward the interiorly-telescoped cover in position for engagement of the bolt at closed position of the cover.

2. In a can comprising a body and cover telescoped with each other for closing, the cover being upwardly-opened-cup-shaped and telescoped within the body, in combination with such body and cover, a locking device comprising a mount or bolt housing mounted on the exposed wall of the cup-shaped cover within the cup cavity thereof, the body having a groove at its telescoped part opening toward the interiorly-telescoped cover in position for engagement of the bolt at closed position of the cover; the body being apertured at the groove for drainage to the exterior of liquid entering the groove from the cup-cavity of the cover.

3. In a can comprising a body and cover telescoped with each other for closing, the cover being upwardly-opened-cup-shaped and telescoped within the body, in combination with such body and cover, a locking device comprising a mount or bolt-housing mounted on the exposed wall of the cup-shaped cover within the cup cavity thereof; the body having a groove at its telescoped part opening toward the interiorly-telescoped cover in position for engagement of the bolt at closed position of the cover, the body being reduced in diameter to form an upwardly-facing shoulder at the lower side of the groove, and the cover having a corresponding shoulder overhanging that of the body in the groove; the body being apertured at the groove for drainage to the exterior of liquid entering the groove from the cup-cavity of the cover.

4. In a can comprising a body and cover telescoped with each other for closing, the cover being upwardly-opened-cup-shaped and telescoped within the body, in combination with such body and cover a locking device comprising a mount or bolt-housing mounted on the exposed wall of the cup-shaped cover within the cup cavity thereof, the body having a groove at its telescoped part opening toward the interiorly-telescoped cover in position for engagement of the bolt at closed position of the cover, the body being reduced in diameter to form an upwardly-facing shoulder at the lower side of the groove, said shoulder being sloped down outwardly into the groove, the body having apertures at the groove for draining to the exterior of liquid entering the groove from the cup cavity of the cover.

5. In a can comprising a body and cover telescoped with each other for closing, the cover being upwardly-opened-cup-shaped and telescoped within the body, in combination with such body and cover a locking device comprising a mount or bolt-housing mounted on the exposed wall of the cup-shaped cover within the cup cavity thereof, the body having a groove at its telescoped part opening toward the interiorly-telescoped cover in position for engagement of the bolt at closed position of the cover, the body being reduced in diameter to form an upwardly-facing shoulder at the lower side of the groove; said shoulder being sloped down outwardly into the groove the cover being similarly reduced in diameter to form a shoulder overhanging that of the body within the groove, and means for stopping the telescoping movement of the cover into the body before said shoulder of the cover reaches the shoulder of the body; the body being apertured at the groove for drainage to the exterior.

6. In a can comprising a body and cover telescoped with each other for closing the cover being upwardly-opened-cup-shaped and telescoped within the body, in combination with such body and cover a locking device comprising a mount or bolt-housing mounted on the exposed wall of the cup-shaped cover within the cup cavity thereof, the body having a groove at its telescoped part opening toward the interiorly-telescoped cover in position for engagement of the bolt at closed position of the cover, the body being reduced in diameter to form an upwardly-facing shoulder at the lower side of the groove, and said lower side of the groove being sloped down outwardly from the inner circumference of said shoulder and having apertures at the deepest point thereof for drainage to the exterior.

7. In a can comprising a body and cover telescoped with each other for closing, the cover being upwardly-opened-cup-shaped and telescoped within the body, in combination with such body and cover a locking device comprising a mount or bolt housing mounted on the exposed wall of the cup-shaped cover within the cup cavity thereof, the body having a groove at its telescoped part opening toward the interiorly-telescoped cover in position for engagement of the bolt at closed position of the cover, the body being reduced in diameter to form an upwardly-facing shoulder at the lower side of the groove, and the cover being similarly reduced in diameter to form a shoulder overhanging that of the body in the groove, the lower side of the groove from the inner circumference of the shoulder outwardly and the shoulder of the cover from its inner circumference to its outer circumference being both sloped downward, the groove having apertures at its deepest point for drainage to the exterior.

8. In combination with the telescoped members, a locking device comprising a mount or bolt-housing mounted on the exposed wall of one of said members, said mount having a bolt aperture and a V-shaped projection, having a slot cutting its apex in line with and leading to the bolt aperture, and having at the apex at each side of the slot a guard projection, and a seal bolt adapted to be entered edgewise in the slot and thrust endwise through the aperture, and weakened for folding over the apex of the mount in either direction under either guard projection, and adapted to be broken upon being straightened back to its original form.

In testimony whereof, I have hereunto set my hand at Chicago, Illinois, this 22nd day of March, A. D., 1915.

EMIL TYDEN.

Witnesses:
EDNA M. MacINTOSH,
LUCY I. STONE.